United States Patent
Kulick et al.

(10) Patent No.: US 9,239,747 B1
(45) Date of Patent: Jan. 19, 2016

(54) IMAGE TIMESTAMP CORRECTION USING METADATA

(71) Applicant: Google Inc., Mountain View, CA (US)

(72) Inventors: Matthew Kulick, San Francisco, CA (US); Erik Murphy-Chutorian, Palo Alto, CA (US); David Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 14/027,581

(22) Filed: Sep. 16, 2013

(51) Int. Cl.
*G06F 11/00* (2006.01)
*G06F 11/07* (2006.01)

(52) U.S. Cl.
CPC .................... *G06F 11/0757* (2013.01)

(58) Field of Classification Search
CPC ............ G06F 17/30353; G06F 17/30292; G06F 17/30356; G06F 17/30056; G06F 2201/86; G06F 11/3003; H04L 47/28; H04L 69/28
See application file for complete search history.

(56) References Cited

U.S. PATENT DOCUMENTS

| | | | | |
|---|---|---|---|---|
| 7,280,156 | B2 * | 10/2007 | Roelens | 348/512 |
| 7,626,942 | B2 * | 12/2009 | Klammer | 370/252 |
| 8,209,539 | B2 * | 6/2012 | Baudry et al. | 713/178 |
| 8,314,726 | B2 | 11/2012 | Cannillo et al. | |
| 8,578,270 | B2 * | 11/2013 | Chu | 715/267 |
| 8,918,541 | B2 * | 12/2014 | Morrison et al. | 709/248 |
| 8,938,636 | B1 * | 1/2015 | Hochschild et al. | 713/401 |
| 2013/0293709 | A1 * | 11/2013 | Cha et al. | 348/143 |
| 2014/0006458 | A1 * | 1/2014 | Hsieh et al. | 707/803 |

FOREIGN PATENT DOCUMENTS

| | | |
|---|---|---|
| JP | 4565308 B2 | 3/2003 |
| JP | 2004128870 A | 4/2004 |
| JP | 2004357166 A | 12/2004 |

* cited by examiner

*Primary Examiner* — Nadeem Iqbal
(74) *Attorney, Agent, or Firm* — IP Spring

(57) ABSTRACT

Implementations generally relate to improving metadata. In some implementations, a method includes determining timestamps, where the timestamps correspond to images. The method also includes determining one or more reference times based on predetermined metadata. The method also includes detecting a timestamp error in one or more timestamps based on the one or more reference times. The method also includes adjusting each timestamp having a timestamp error based on the one or more reference times.

20 Claims, 4 Drawing Sheets

IMAGE TIMESTAMP CORRECTION USING METADATA

BACKGROUND

Social network systems often enable users to upload media content such as photos, and enable users to create photo albums. Social network systems also enable users to share photos with each other. A user can create a photo album that is associated with the user's profile. As the owner of the photo album, the user can then allow other users to view the photo album when visiting the photo section of the user's profile. Photos may have associated metadata created by digital cameras and by smartphones with embedded cameras, which might not be accurate.

SUMMARY

Implementations generally relate to improving metadata. In some implementations, a method includes determining timestamps, where the timestamps correspond to images. The method also includes determining one or more reference times based on predetermined metadata. The method also includes detecting a timestamp error in one or more timestamps based on the one or more reference times. The method also includes adjusting each timestamp having a timestamp error based on the one or more reference times.

With further regard to the method, in some implementations, the reference times include an internal clock reset time associated with a particular camera device. In some implementations, the reference times include times associated with an event. In some implementations, the predetermined metadata includes one or more of image metadata, location metadata, event metadata, and camera device metadata. In some implementations, the detecting of a timestamp error in one or more timestamps includes: comparing each timestamp to the one or more reference times; and detecting a difference between at least one timestamp and the one or more reference times, where the difference meets a predetermined difference criteria. In some implementations, the detecting of a timestamp error in one or more timestamps includes: determining timestamps associated with a sequence of images; determining one or more reference times from the tracked timestamps; and detecting jumps in time in a given timestamp from the other timestamps in the same sequence. In some implementations, the adjusting of the one or more timestamps having a timestamp error includes adjusting one or more timestamps that are related, and where the adjusted one or more timestamps are related based on one or more relationship criteria. In some implementations, the adjusting of the one or more timestamps having a timestamp error includes adjusting one or more timestamps by a constant offset.

In some implementations, a method includes determining timestamps, where the timestamps correspond to images. The method further includes determining one or more reference times based on predetermined metadata, where the reference times include an internal clock reset time associated with a particular camera device, where the reference times include times associated with an event, and where the predetermined metadata includes one or more of image metadata, location metadata, event metadata, and camera device metadata. The method further includes detecting a timestamp error in one or more timestamps based on the one or more reference times. The method further includes adjusting each timestamp having a timestamp error based on the one or more reference times.

With further regard to the method, in some implementations, the detecting of a timestamp error in one or more timestamps includes: comparing each timestamp to the one or more reference times; and detecting a difference between at least one timestamp and the one or more reference times, where the difference meets a predetermined difference criteria. In some implementations, the detecting of a timestamp error in one or more timestamps includes: tracking timestamps associated with a sequence of images; determining one or more reference times from the tracked timestamps; and detecting jumps in time in a given timestamp compared to other timestamps in the same sequence. In some implementations, the adjusting of the one or more timestamps having a timestamp error includes adjusting one or more timestamps that are related, and where the adjusted one or more timestamps are related based on one or more relationship criteria. In some implementations, the adjusting of the one or more timestamps having a timestamp error includes adjusting one or more timestamps by a constant offset.

In some implementations, a system includes one or more processors, and logic encoded in one or more tangible media for execution by the one or more processors. When executed, the logic is operable to perform operations including: determining timestamps, where the timestamps correspond to images; determining one or more reference times based on predetermined metadata; detecting a timestamp error in one or more timestamps based on the one or more reference times; and adjusting each timestamp having a timestamp error based on the one or more reference times.

With further regard to the system, in some implementations, the reference times include an internal clock reset time associated with a particular camera device. In some implementations, the reference times include times associated with an event. In some implementations, the predetermined metadata includes one or more of image metadata, location metadata, event metadata, and camera device metadata. In some implementations, to detect a timestamp error in one or more timestamps, the logic when executed is further operable to perform operations including: comparing each timestamp to the one or more reference times; and detecting a difference between at least one timestamp and the one or more reference times, where the difference meets a predetermined difference criteria. In some implementations, to detect a timestamp error in one or more timestamps, the logic when executed is further operable to perform operations including: determining timestamps associated with a sequence of images; determining one or more reference times from the tracked timestamps; and detecting jumps in time in a given timestamp from the other timestamps in the same sequence. In some implementations, to adjust the one or more timestamps having a timestamp error, the logic when executed is further operable to perform operations including adjusting one or more timestamps that are related, and where the adjusted one or more timestamps are related based on one or more relationship criteria.

DETAILED DESCRIPTION

Implementations for correcting timestamps are described. In various implementations, a system determines timestamps, where the timestamps correspond to image files, described herein as images. The system then determines one or more reference times based on predetermined metadata. In some implementations, the reference times may include an internal clock reset time associated with a particular camera device. In some implementations, the reference times may include times associated with an event. In some implementations, the predetermined metadata may include one or more of image metadata, location metadata, event metadata, and camera device metadata.

The system then detects a timestamp error in one or more timestamps based on the one or more reference times. In some implementations, the detecting of a timestamp error in one or more timestamps includes: comparing each timestamp to the one or more reference times; and detecting a difference between at least one timestamp and the one or more reference times, where the difference meets a predetermined difference criteria. In some implementations, the detecting of a timestamp error in one or more timestamps includes: determining timestamps associated with a sequence of images; determining one or more reference times from the tracked timestamps; and detecting jumps in time in a given timestamp compared to other timestamps in the same sequence of associated images. For example, if a given timestamp jumps significantly from other timestamps of a sequence of images, the given timestamp may be incorrect.

The system then adjusts, for each timestamp having a timestamp error, the timestamp to substantially match at least one of the reference times. In some implementations, the adjusting of the one or more timestamps having a timestamp error includes adjusting one or more timestamps that are related, where the adjusted timestamps are related based on one or more relationship criteria. In some implementations, the adjusting of the one or more timestamps having a timestamp error includes adjusting one or more timestamps by a constant offset. For example, if a set of images have incorrect timestamps yet are off by the same amount, the system may adjust all of the incorrect timestamps using the constant offset.

Figure 1:
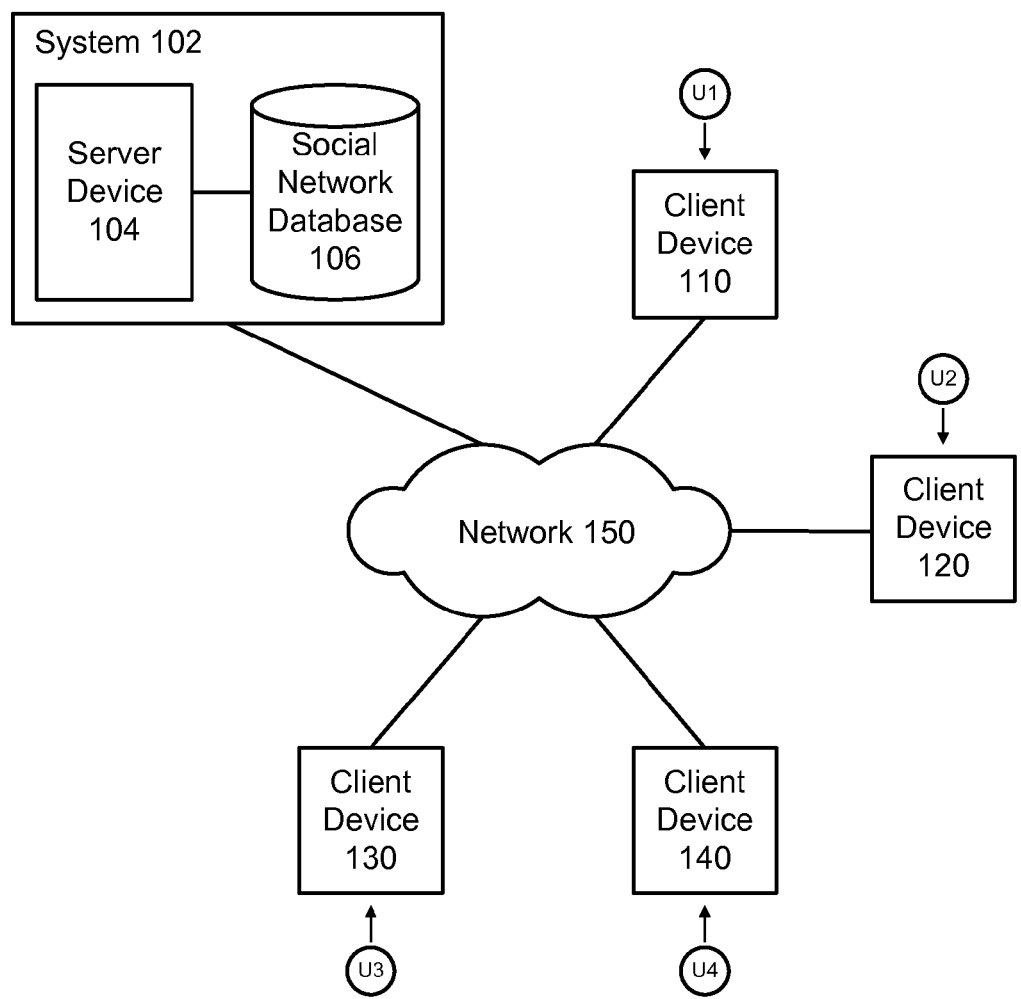
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other and with system 102 using respective client devices 110, 120, 130, and 140. For example, users U1, U2, U3, and U4 may upload images to system 102 using respective client devices 110, 120, 130, and 140.

In the various implementations described herein, processor of system 102 causes some of the elements described herein (e.g., user interface, messages, etc.) to be displayed in a user interface on one or more display screens.

While some implementations are described herein in the context of a social network system, these implementations may apply in contexts other than a social network. For example, implementations may apply locally for an individual user. For example, system 102 may perform the implementations described herein on a stand-alone computer, computer tablet, smartphone, etc.

Figure 2:
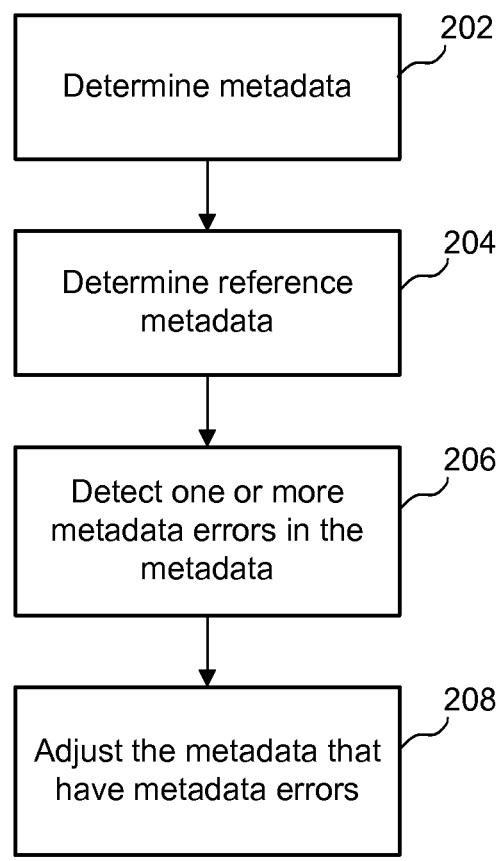
FIG. 2 illustrates an example simplified flow diagram for improving metadata, according to some implementations.

FIG. 2 illustrates an example simplified flow diagram for improving metadata, according to some implementations. Referring to both FIGS. 1 and 2, a method is initiated in block 202, where system 102 determines metadata associated with images. In some implementations, the metadata includes timestamps, where the timestamps correspond to images. In block 204, system 102 determines reference metadata based. In various implementations, the metadata associated with images and the reference metadata may be exchangeable image file format metadata created by digital devices such as cameras and smartphones. In block 206, system 102 then detects one or more metadata errors in the metadata based on the reference metadata. In block 208, system 102 then adjusts the metadata that have metadata errors based on the reference metadata.

Various implementations are described in more detail in connection with FIG. 3. While various implementations are described herein in the context of timestamps, these implementations may also apply to other types of metadata such as tags, geo-location, etc. While image files are described herein, implementations may also refer to other file types (e.g., video files, etc.).

Figure 3:
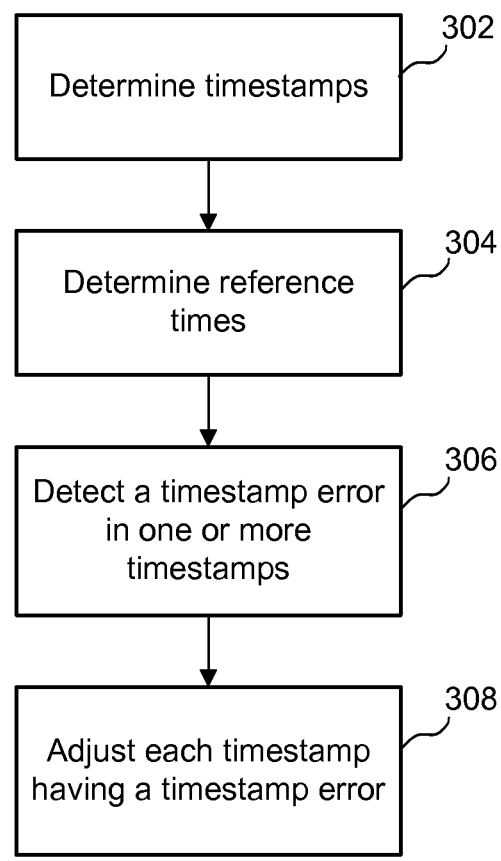
FIG. 3 illustrates an example simplified flow diagram for improving timestamp metadata, according to some implementations.

FIG. 3 illustrates an example simplified flow diagram for improving timestamp metadata, according to some implementations. Referring to both FIGS. 1 and 3, a method is initiated in block 302, where system 102 determines timestamps, where the timestamps correspond to images. System 102 may determine the timestamps from images as the images are uploaded to system 102 or later after the images have already been stored in system 102. System 102 may scan all photos associated with a user's account, or may scan all photos in system 102, in order to correct timestamps.

In various implementations, system 102 may receive images from a user. In various implementations, the images may be received when the user uploads the images to system 102 or after the user adds the images to one or more photo albums. In some implementations, system 102 may enable a camera device (e.g., smart phone) of the user to automatically upload images to system 102 as the camera device captures photos.

In block 304, system 102 then determines one or more reference times based on predetermined metadata. In some implementations, the reference times may include an internal clock reset time associated with a particular camera device. For example, if a particular digital camera where created on Jan. 31, 2010, the internal clock reset time may be 1/31/10 or another predetermined time following 1/31/10. As described in more detail below, system 102 may compare the timestamp to such a reference time to determine if the timestamp is reasonable. For example, if a timestamp is the same as the internal clock reset time, the timestamp is probably not correct.

In some implementations, system 102 may access any suitable database or databases of internal clock reset times and corresponding camera makes and models. Such databases may be available internally to system 102 or externally (e.g., via the Internet or other network).

In some implementations, the reference times include times associated with an event. For example, if there is a social event, it would be expected that many of the attendees would take photos at the event. As such, the reference times may include at least the start time and end time of the event. In some implementations, reference times may also include check in times, where one or more users check in at a particular location (e.g., restaurant, bar, hotel, etc.).

In various implementations, the predetermined metadata may include one or more of image metadata, location metadata, event metadata, and camera device metadata. As described in more detail below, system 102 may utilize such metadata to ascertain groups of related images, sequences of images, as well as to ascertain incorrect timestamps and to ascertain correct timestamps to be used as reference times for correction purposes.

In various implementations, system 102 may utilize a recognition algorithm to determine reference images with corresponding reference times. Example implementations of recognition algorithms are described in more detail below.

For ease of illustration, some implementations are described in the context of images provided by a single user. Such implementations also apply to images from different users. For example, as described in more detail below, system 102 may compare a given timestamp associated with an image provided by a given user with reference times from one or more reference times associated with images of other users.

In block 306, system 102 detects a timestamp error in one or more timestamps based the one or more reference times. In some implementations, to detect a timestamp error in one or more timestamps, system 102 compares each timestamp with a reference time, where the reference time is a predetermined internal clock reset time. System 102 determines that there is a timestamp error if the timestamp matches the predetermined internal clock reset time.

For example, if the timestamp of a given image matched the internal clock reset time (e.g., 1/31/10, the manufacturing date of the camera or other predetermined internal clock reset time), system 102 may determine that the timestamp associated with the image is incorrect. This would be because the timestamp should be at a later date than the manufacturing date. In some scenarios, inaccurate timestamps might match a clock reset time exactly, which might not occur often. In some scenarios, inaccurate timestamps might match "near" the clock reset time. When a camera loses power, it is possible for the internal clock of the camera to go to the internal clock reset time. As such, subsequent images would have timestamps based on an inaccurate internal clock. The internal clock of the camera may still count up from that point forward, and may be substantially off (e.g., by years, etc.).

In some implementations, to detect a timestamp error in one or more timestamps, system 102 compares each timestamp to the one or more reference times; and detects a difference between at least one timestamp and the one or more reference times, where the difference meets a predetermined difference criteria. For example, the predetermined difference criteria may include a threshold time difference between a given timestamp and other timestamps associated with the same group of images (e.g., images from a trip). Example implementations are described in detail below.

In some implementations, to detect a timestamp error in one or more timestamps, system 102 determines timestamps associated with a sequence of images. In various implementations, the images in the sequence of images may be related based on one or more relationship criteria. For example, images may be related based on the images being captured at the same event (e.g., a wedding). Images may be related based on the images being captured at the same location (e.g., San Francisco). System 102 then determines one or more reference times from the tracked timestamps, and then detects jumps in time in a given timestamp from the other timestamps in the same sequence. System 102 may determine that there is a timestamp error if the timestamp is substantially different from (e.g., contradicts) the other timestamps in the same sequence.

In some implementations, to determine if a group of images are related, system 102 may utilize a recognition algorithm to determine images with similar content. For example, images may include the same person or group of people, same background, same objects or monuments in the background, etc.). Example implementations of recognition algorithms are described in more detail below.

In some implementations, for auto backup enabled accounts, system 102 may detect highly unlikely timestamps from recent images that are periodically sent to system 102 for storage and security. Such images should be sent as images are captured, at the end of the day, or when the user logs onto the user's account while the images are still fresh. If system 102 starts identifying images going to the cloud/system 102 that are years old (years off from the current date), system 102 may determine that the images associated with those images are incorrect. In some scenarios, "auto-backup enabled" accounts may be significant in the sense that the images in question were probably uploaded in some meaningful ordering, which allows system 102 to detect "jumps" in time. If the images were uploaded out of order, in general, system 102 may take into account other factors to order to infer jumps (e.g., filename semantics such as IMG_<DATE>_<PHOTO#>.jpg).

In some implementations, system 102 may keep track of the state of a user's camera clock by analyzing his or her image upload stream and associated metadata. For example, system 102 may track a sequence of images, including file names, locations, and timestamps associated with the images. The timestamps of the images in the same set of images, whether related by file names, geo-location, etc., should increase at a relatively predictable rate. System 102 may determine that a given timestamp is incorrect if a timestamp jumps significantly (e.g., back by years), which would probably be due to the internal clock of the camera.

In some implementations, system 102 may correlate geo-location information from images with flight information or other signals to verify/improve timestamps. For example, if the user is traveling, system 102 may determine the user's associated global positioning system (GPS) locations that are logged using any of the user's electronic devices (e.g., camera, smartphone, notebook computer, etc.). System 102 may also determine the user's outbound and return flight dates, destinations, etc. Between such outbound and return flight dates, images captured should have timestamps and geo-locations consistent with those flight dates and destinations. System 102 may determine that timestamps are incorrect if images match the geo-location but the timestamp dates do not fall between the outbound and return flight dates. In various implementations, system 102 may not only correct bad metadata, but may also suggest metadata where none previously existed. For example, an image could lack a timestamp or location, and system 102 may suggest one.

In some implementations, system 102 may correlate people tags from images with geo-location information with images provided by friends in a social network to verify/improve timestamps. For example, if a group of users in a social network check in to the same location (e.g., a restaurant), timestamps of images taken at the location should be consistent. System 102 may determine that timestamps associated with such images are incorrect if the timestamps are inconsistent with the timestamps associated with images captured by the other users.

In some implementations, system 102 may correlate exchangeable image file format (EXIF) metadata from other photos within the same event to detect spurious metadata. For example, if a group of users attend the same event (e.g., wedding, party, potluck, etc.), all contributing photos to the event should have timestamps that are close in time and within the duration of the event. System 102 may determine that timestamps associated with such images are incorrect if the timestamps are inconsistent with the event times and with the timestamps associate with images captured by the other users.

In block 308, system 102 adjusts each timestamp having a timestamp error based on the one or more reference times. In some implementations, system 102 may substantially match the timestamp having the timestamp error with at least one of the reference times.

In some implementations, system 102 may adjust the one or more timestamps having a timestamp error by adjusting one or more timestamps that are related, where the adjusted timestamps are related based on one or more relationship criteria. For example, images may be deemed to be related based on common content, common geo-location, common tags, travel dates, etc. In various implementations, when adjusting timestamps or metadata, the newly adjusted values may be stored as separate and/or derived timestamps/metadata, and marked as such for subsequent processing. This would help prevent accidental data corruption and allow for future adjustments. Storing the data separately yet in association could also allow for access-control-list (ACL) limited derivations, where the information used to infer the new timestamp is not accessible to all viewers of the image. For example, if private information from other unshared photos is used to compute a new timestamp, system 102 may mark and store the new timestamp in such a way that it is inaccessible to users who should not have access. In some implementations, such data may also be encrypted to limit access.

In some implementations, system 102 may adjust timestamps having timestamp errors by adjusting timestamps associated with related images, and adjusting the timestamps by a constant offset. For example, if a given group of timestamps are deemed to be incorrect and the first timestamps is set to a default internal clock reset time, the timestamps subsequent to the first incorrect timestamp are probably correctly spaced but based on an incorrect base time (e.g., the internal clock reset time). As such, system 102 may apply a constant offset to the incorrect timestamps.

In some implementations, system 102 may flag photos that are likely to need correction. In some implementations, system 102 may automatically correct the timestamps. In some implementations, system 102 may alert the user of possible errors in timestamps.

In some implementations, system 102 may alert the user of possible errors in timestamps, and enable the user to approve suggested corrections and/or enter correct timestamp information. In some implementations, system 102 may provide the user with a user interface that may enable options for the user to enter the correct date, and even to reset the internal clock on the user's camera.

In some implementations, system 102 may refuse to use/ignore the incorrect dates in searches or in ranking systems. For example, in some implementations, when system 102 rounds a given timestamp, system 102 may leave undetermined metadata blank instead of zeroing the undetermined metadata. This is to prevent subsequent processing (e.g., searches) based on inaccurate metadata (even zero values). Instead, subsequent processing may simply ignore some metadata (e.g., timestamp seconds, timestamp minutes, etc.). Sometimes, a general time period (e.g., holidays) is sufficient for subsequent processing. In various implementations, system 102 may mark such fields as "derived" so downstream processing can choose whether or not to use the data.

In some implementations, system 102 may estimate correct times for timestamps based on one or more signals. Such signals may include, for example, reference times/timestamps of photos that are deemed to be related (e.g., same content, same event, same geo-location, etc.). By analyzing EXIF metadata associated with related images, system 102 may establish a minimum realistic timestamp for images. Where there is a group of images with incorrect timestamps, system 102 may determine that they are all off by the same amount of time and apply the same or similar adjustment to the group of timestamps.

In various implementations, system 102 may apply different granularities of correction. For example, system 102 may round timestamps to the nearest hours, days, months, years, etc., depending on the accuracy of the corrections. For example, system 102 may determine that a group of incorrect timestamps are associated with a particular event occurring on a particular day but the exact times of the day are undetermined. System 102 may round the corrections to that day and leave the times blank.

In some implementations, system 102 may correct metadata including timestamps for all images within a given time range by applying a constant offset. In some implementations, the offset may be defined by enabling the user to take a photo of a quick response (QR) code or any bar code. For clarity, in various implementations, system 102 may generate the QR code at a known time and with a reference timestamp.

In some implementations, system 102 may correct timestamps across cameras. For example, system 102 may align the timestamps of images of the user across the user's different cameras (e.g., dedicated digital camera, smartphone camera, etc.). In some implementations, system 102 may correct the timestamps across cameras based on common content, location, photo album, etc. In some implementations, system 102 may check the timestamps of images taken by a particular camera if system 102 determines that the camera as been off for more than a predetermined amount of time (e.g., 8 hours, etc.).

In some implementations, system 102 may use optical character recognition (OCR) to identify "burned in" timestamps from film photos and then convert the burned in timestamps into EXIF metadata.

Implementations described herein provide various benefits. For example, implementations described herein improve overall accuracy of metadata such as timestamps associated with images. Implementations also enable users to accurately search and retrieve images based on time parameters. Implementations may also enable photos to be more accurately grouped and displayed together or arranged in a specific way (e.g., chronologically). Implementations also support both correcting bad data and appending new, suggested data where the data did not previously exist.

Although the description has been described with respect to particular embodiments thereof, these particular embodiments are merely illustrative, and not restrictive. Concepts illustrated in the examples may be applied to other examples and implementations. For example, correcting a timestamp of any media item (e.g., image, video file, etc.) such that the media item is timestamped with the correct date may greatly increase the chances that the media item being found in a search or otherwise accessed (e.g., by the owner user, by other users in a social network, etc.). As indicated above, system 102 may provide missing metadata. For instance, if a user were to edit and save an image or other file to a new file format which was then uploaded to system 102, the metadata of the new file format might not be saved with a timestamp. System 102 may be able to provide timestamp data for the new file.

Although the steps, operations, or computations may be presented in a specific order, the order may be changed in particular implementations. For example, in some implementations, system 102 may determine timestamps before determining reference times, as described above. In some implementations, system 102 may determine references times before determining timestamps. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Figure 4:
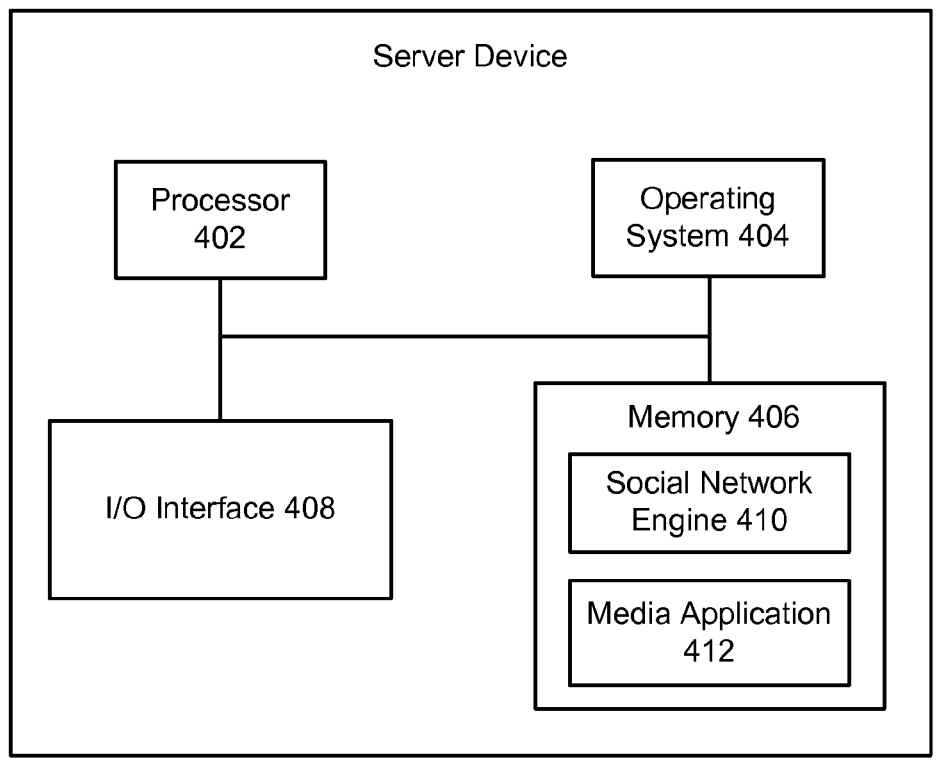
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
    determining one or more timestamps, wherein the one or more timestamps correspond to one or more images in a sequence of images;
    determining one or more reference times based on predetermined metadata, wherein the one or more reference times include one or more of an internal clock reset time associated with a particular camera device and a time associated with an event, and wherein the predetermined metadata includes one or more of image metadata, location metadata, event metadata, and camera device metadata;
    detecting one or more timestamp errors in one or more timestamps, wherein the detecting of the one or more timestamp errors includes detecting one or more jumps in time in one or more timestamps from other timestamps in the sequence; and
    adjusting each timestamp having a timestamp error based on the one or more reference times.

2. The method of claim 1, wherein the detecting of the one or more timestamp errors comprises:
    comparing each timestamp to the one or more reference times; and
    detecting a difference between at least one timestamp and the one or more reference times, wherein the difference meets a predetermined difference criteria.

3. The method of claim 1, wherein the detecting of the one or more timestamp errors comprises:
    tracking timestamps associated with the sequence of images;
    determining one or more of the reference times from the tracked timestamps; and
    detecting the one or more jumps in time in the one or more timestamps compared to other timestamps in the sequence.

4. The method of claim 1, wherein the adjusting of the one or more timestamps having a timestamp error comprises adjusting the one or more timestamps having timestamp error to one or more timestamps that are related, and wherein the adjusted one or more timestamps are related based on one or more relationship criteria.

5. The method of claim 1, wherein the adjusting of the one or more timestamps having a timestamp error comprises adjusting one or more timestamps having a timestamp error by a constant offset.

6. A method comprising:
determining one or more timestamps, wherein the one or more timestamps correspond to one or more images in a sequence of images;
determining one or more reference times based on predetermined metadata;
detecting one or more timestamp errors in one or more timestamps, wherein the detecting of the one or more timestamp errors includes detecting one or more jumps in time in one or more timestamps from other timestamps in the sequence; and
adjusting each timestamp having a timestamp error based on the one or more reference times.

7. The method of claim 6, wherein the reference times include an internal clock reset time associated with a particular camera device.

8. The method of claim 6, wherein the reference times include one or more times associated with an event.

9. The method of claim 6, wherein the predetermined metadata includes one or more of image metadata, location metadata, event metadata, and camera device metadata.

10. The method of claim 6, wherein the detecting of the one or more timestamp errors comprises:
comparing each timestamp to the one or more reference times; and
detecting a difference between at least one timestamp and the one or more reference times, wherein the difference meets a predetermined difference criteria.

11. The method of claim 6, wherein the detecting of the one or more timestamp errors comprises determining that one or more timestamps of one or more corresponding images match an internal clock reset time associated with a particular camera device.

12. The method of claim 6, wherein the adjusting of the one or more timestamps having a timestamp error comprises adjusting the one or more timestamps having timestamp error to one or more timestamps that are related, and wherein the adjusted one or more timestamps are related based on one or more relationship criteria.

13. The method of claim 6, wherein the adjusting of the one or more timestamps having a timestamp error comprises adjusting one or more timestamps having a timestamp error by a constant offset.

14. A system comprising:
one or more processors; and
logic encoded in one or more tangible media for execution by the one or more processors and when executed operable to perform operations comprising:
determining one or more timestamps, wherein the one or more timestamps correspond to one or more images in a sequence of images;
determining one or more reference times based on predetermined metadata;
detecting one or more timestamp errors in one or more timestamps, wherein the detecting of the one or more timestamp errors includes detecting one or more jumps in time in one or more timestamps from other timestamps in the sequence; and
adjusting each timestamp having a timestamp error based on the one or more reference times.

15. The system of claim 14, wherein the reference times include an internal clock reset time associated with a particular camera device.

16. The system of claim 14, wherein the reference times include one or more times associated with an event.

17. The system of claim 14, wherein the predetermined metadata includes one or more of image metadata, location metadata, event metadata, and camera device metadata.

18. The system of claim 14, wherein to detect the one or more timestamp errors, the logic when executed is further operable to perform operations comprising:
comparing each timestamp to the one or more reference times; and
detecting a difference between at least one timestamp and the one or more reference times, wherein the difference meets a predetermined difference criteria.

19. The system of claim 14, wherein to detect the one or more timestamp errors, the logic when executed is further operable to perform operations comprising determining that one or more timestamps of one or more corresponding images match an internal clock reset time associated with a particular camera device.

20. The system of claim 14, wherein to adjust the one or more timestamps having a timestamp error, the logic when executed is further operable to perform operations comprising adjusting the one or more timestamps having a timestamp error to one or more timestamps that are related, and wherein the adjusted one or more timestamps are related based on one or more relationship criteria.

\* \* \* \* \*